United States Patent [19]
Wetzel et al.

[11] Patent Number: 5,534,733
[45] Date of Patent: Jul. 9, 1996

[54] DIGITAL DIMMING AND FLASHING CIRCUIT FOR LOCOMOTIVE DITCH LIGHTS

[75] Inventors: Donald C. Wetzel, Berea; Robert A. Livsey, Richmond Heights, both of Ohio

[73] Assignee: Meg Trans Corp., Berea, Ohio

[21] Appl. No.: 82,617

[22] Filed: Jun. 25, 1993

[51] Int. Cl.⁶ .................. B60Q 1/26; B60Q 1/54
[52] U.S. Cl. .................. 307/9.100; 307/10.8; 315/77; 315/322; 340/425.5; 340/466; 340/469
[58] Field of Search .................. 307/9.1, 10.1, 307/10.8, 120, 129, 265, 269; 315/312–315, 322, 200 A, 77, 79, 82, 83, 130; 340/471, 425.5, 466, 469; 328/63; 327/172, 141

[56] References Cited

U.S. PATENT DOCUMENTS

| | | | |
|---|---|---|---|
| 3,805,167 | 4/1974 | Nash et al. | 328/63 |
| 4,114,071 | 9/1978 | Thrower, Jr. et al. | 315/82 |
| 4,171,526 | 10/1979 | Bauer | 307/265 |
| 4,284,926 | 8/1981 | Dinges | 315/312 |
| 4,325,007 | 4/1982 | Prohaska et al. | 315/77 |
| 4,388,558 | 6/1983 | Mizuno et al. | 315/77 |
| 4,408,142 | 10/1983 | Wilje | 315/82 |
| 4,426,638 | 1/1984 | Donley et al. | 315/83 |
| 4,564,789 | 1/1986 | Kokubu | 315/79 |
| 4,691,330 | 9/1987 | Takahashi et al. | 307/265 |
| 4,841,198 | 6/1989 | Wilhelm | 307/10.8 |
| 4,845,465 | 7/1989 | Kruse et al. | 307/10.8 |
| 4,845,619 | 7/1989 | Steely et al. | 307/10.8 |
| 4,904,998 | 2/1990 | Niimi | 307/10.8 |
| 4,935,641 | 6/1990 | Wilhelm | 307/10.8 |
| 5,075,593 | 12/1991 | Shoda | 315/82 |
| 5,247,280 | 9/1993 | Incorvaia et al. | 340/471 |

*Primary Examiner*—William M. Shoop, Jr.
*Assistant Examiner*—Richard T. Elms
*Attorney, Agent, or Firm*—Rankin, Hill, Lewis & Clark

[57] ABSTRACT

A light is dimmed by pulsing it at a selected duty cycle. By pulsing, the light can be dimmed without being turned off completely which reduces wear on the filament. The circuit is designed for flashing a pair of ditch lights on a railroad locomotive. The lights are alternately illuminated at full voltage and dimmed by pulsing. The flashing sequence can be activated when the locomotive is travelling below a selected speed or when the horn is sounded. The duration of the flashing sequence is controlled by a timer. The pulsing circuit can be used to effectively reduce a voltage without voltage dropping resistors.

20 Claims, 5 Drawing Sheets

| CONTROL SWITCH 19 | TIMER U5 | COUNTER U2 1Hz Q12 | 256Hz Q4 | Q3 | Q2 | LIGHTS 10a | 10b |
|---|---|---|---|---|---|---|---|
| 1 | 0 | X | X | X | X | 1 | 1 |
| 0 | 0 | X | X | X | X | 0 | 0 |
| X | 1 | 0 | 0 | 0 | 0 | 0 | 1 |
|   |   | 0 | 0 | 0 | 1 | 0 | 1 |
|   |   | 0 | 0 | 1 | 0 | 0 | 1 |
|   |   | 0 | 0 | 1 | 1 | 0 | 1 |
|   |   | 0 | 1 | 0 | 0 | 1 | 1 |
|   |   | 0 | 1 | 0 | 1 | 0 | 1 |
|   |   | 0 | 1 | 1 | 0 | 0 | 1 |
|   |   | 0 | 1 | 1 | 1 | 0 | 1 |
|   |   | 1 | 0 | 0 | 0 | 1 | 0 |
|   |   | 1 | 0 | 0 | 1 | 1 | 0 |
|   |   | 1 | 0 | 1 | 0 | 1 | 0 |
|   |   | 1 | 0 | 1 | 1 | 1 | 0 |
|   |   | 1 | 1 | 0 | 0 | 1 | 1 |
|   |   | 1 | 1 | 0 | 1 | 1 | 0 |
|   |   | 1 | 1 | 1 | 0 | 1 | 0 |
|   |   | 1 | 1 | 1 | 1 | 1 | 0 |

Fig.4

| COUNTER U20 128Hz | | | | COMPARATOR U21 | | | | (POSITION 22b) | | | | LIGHT 20 | SWITCH POSITION | |
|---|---|---|---|---|---|---|---|---|---|---|---|---|---|---|
| Q5 | Q4 | Q3 | Q2 | A1 | A2 | A3 | A4 | B1 | B2 | B3 | B4 | 22b | 22a | 22c |
| 0 | 0 | 0 | 0 | 0 | 0 | 0 | 0 | 1 | 0 | 1 | 1 | 1 | 1 | 1 |
| 0 | 0 | 0 | 1 | 1 | 0 | 0 | 0 | 1 | 0 | 1 | 1 | 1 | 1 | 1 |
| 0 | 0 | 1 | 0 | 0 | 1 | 0 | 0 | 1 | 0 | 1 | 1 | 1 | 1 | 1 |
| 0 | 0 | 1 | 1 | 1 | 1 | 0 | 0 | 1 | 0 | 1 | 1 | 0 | 1 | 0 |
| 0 | 1 | 0 | 0 | 0 | 0 | 1 | 0 | 1 | 0 | 1 | 1 | 1 | 1 | 1 |
| 0 | 1 | 0 | 1 | 1 | 0 | 1 | 0 | 1 | 0 | 1 | 1 | 1 | 1 | 0 |
| 0 | 1 | 1 | 0 | 0 | 1 | 1 | 0 | 1 | 0 | 1 | 1 | 1 | 1 | 1 |
| 0 | 1 | 1 | 1 | 1 | 1 | 1 | 0 | 1 | 0 | 1 | 1 | 0 | 1 | 0 |
| 1 | 0 | 0 | 0 | 0 | 0 | 0 | 1 | 1 | 0 | 1 | 1 | 1 | 1 | 1 |
| 1 | 0 | 0 | 1 | 1 | 0 | 0 | 1 | 1 | 0 | 1 | 1 | 1 | 1 | 0 |
| 1 | 0 | 1 | 0 | 0 | 1 | 0 | 1 | 1 | 0 | 1 | 1 | 1 | 1 | 1 |
| 1 | 0 | 1 | 1 | 1 | 1 | 0 | 1 | 1 | 0 | 1 | 1 | 0 | 1 | 0 |
| 1 | 1 | 0 | 0 | 0 | 0 | 1 | 1 | 1 | 0 | 1 | 1 | 1 | 1 | 1 |
| 1 | 1 | 0 | 1 | 1 | 0 | 1 | 1 | 1 | 0 | 1 | 1 | 1 | 1 | 0 |
| 1 | 1 | 1 | 0 | 0 | 1 | 1 | 1 | 1 | 0 | 1 | 1 | 1 | 1 | 1 |
| 1 | 1 | 1 | 1 | 1 | 1 | 1 | 1 | 1 | 0 | 1 | 1 | 0 | 1 | 0 |

DIGITAL DIMMING AND FLASHING CIRCUIT FOR LOCOMOTIVE DITCH LIGHTS

BACKGROUND OF THE INVENTION

1. Field of the Invention

This invention relates generally to the field of light dimming, and specifically, to a ditch light flashing circuit for railroad locomotives.

2. Description of the Related Art

Locomotives have numerous exterior lights serving various purposes. Among these are ditch lights which illuminate an area of the ground ahead of and on either side of the locomotive, that is, the "ditch" along the railroad right-of-way. Railroad safety regulations sometime require that the ditch lights flash to provide a warning to persons at grade crossings that the locomotive is approaching. Typically, the ditch lights are located near each corner of the locomotive to provide the warning in either direction of travel and on both sides of the locomotive.

Lights are typically flashed by alternately applying a voltage and interrupting the voltage. When the voltage is interrupted, the light assumes an "OFF" state. It has been found that the life of an incandescent filament lamp is shortened by the shock of repeatedly applying its rated voltage after extinguishing the lamp. For example, U.S. Pat. No. 4,904,998 to Niimi shows a digital flashing circuit using a timer and a counter. Lights are flashed by alternately fully energizing and de-energizing them.

To avoid this shock effect, resistors have been connected in series with the lamp to reduce its illumination to a dull glow during "OFF" periods. In AC systems, an inductive choke has been used. These dimming circuits waste energy dissipated from the resistors, or other devices.

Headlights are also utilized at each end of a locomotive to illuminate the right-of-way ahead of the locomotive. The headlights generally do not flash, but may have several levels of illumination, for example, full, medium, and dim. To dim the headlights, resistors are commonly connected in series with the lights to reduce the voltage across the lights. The resistors dissipate energy when the lights are dimmed.

It is desirable to have a flashing circuit which does not completely interrupt the voltage to the lamp during an "OFF" state of the flashing sequence, thereby increasing the service life of the lamp. The use of dimming resistors should be eliminated to save energy and reduce heat. When applied to locomotive ditch lights, such a circuit should operate automatically at appropriate times during locomotive operation.

It would also be desirable to have a circuit which effectively dims a locomotive headlight without the need for voltage dropping resistors.

SUMMARY OF THE INVENTION

The present invention is a control circuit for an element connectable across a voltage. The circuit includes switch means connected to control the voltage across the element and dimming means connected to control the switch means to selectively energize the element with a series of voltage pulses at a specific duty cycle.

The circuit "dims", that is, effectively drops the voltage across, an element or component. A timer is used to generate a series of clock pulses which are input to a counter. Outputs of the counter are combined in a logic circuit or compared to a selected input value to provide the desired pulses at a selected frequency and duty cycle.

In the embodiments shown, the element is a light, such as an incandescent lamp. The circuit can be adapted to select one of several different levels of illumination. By dimming a light in this manner, voltage dropping resistors, such as rheostats, are not required.

The circuit can be adapted to alternate between two levels of illumination to flash the light. The lower level can be relatively imperceptible illumination and the higher level can be full illumination.

The circuit can be used to control warning lights on a vehicle, such as a railroad locomotive. For example, the lights can be large wattage ditch lights located near four corners of a locomotive to flash and illuminate an area adjacent a track on which the locomotive rides to provide a warning to persons at grade crossings. Two lights at each end are alternately illuminated and pulsed so as to be dimmed. By pulsing the light when it is dimmed, the life of the light is extended by reducing the shock to the filament which occurs when the light is alternately fully illuminated and fully extinguished. The preferred duty cycle and frequency of the pulses are dependent on the power rating of the lights and the magnitude of the voltage.

A timer is used to enable the dimming circuit. When the timer is triggered, a flashing sequence is initiated for a specified time. The timer can be triggered by a sensed condition such as motion of the locomotive, adjustment of a throttle, sounding a horn, or pressing a test switch.

A control switch is provided to fully illuminate both lights continuously. The timer is connected to override the control switch when the timer is triggered.

DESCRIPTION OF THE PREFERRED EMBODIMENT

Figure 1:
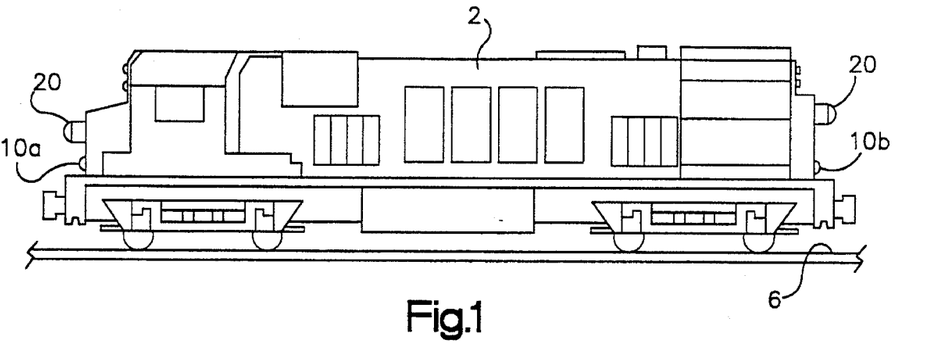
FIG. 1 shows a railroad locomotive according to the invention.

Referring to FIG. 1, a railroad locomotive 2 has a headlight 20 at each end adapted to illuminate a right-of-way ahead of the locomotive in whichever direction the locomotive is travelling on a track 6. Pairs of ditch lights 10 are provided at each end of the locomotive 2 as well. A left side ditch light 10a and a right side ditch light 10b are provided at each end to illuminate an area around the track 6 and ahead of the locomotive 2 on the left and right sides of the locomotive, respectively. Thus, the lights 10 are directed forwardly, downwardly, and outwardly from the locomotive. The lights 10 are adapted to burn steadily for illumination or to flash thereby providing a warning signal to people in the vicinity of the track 6.

Figure 2A:
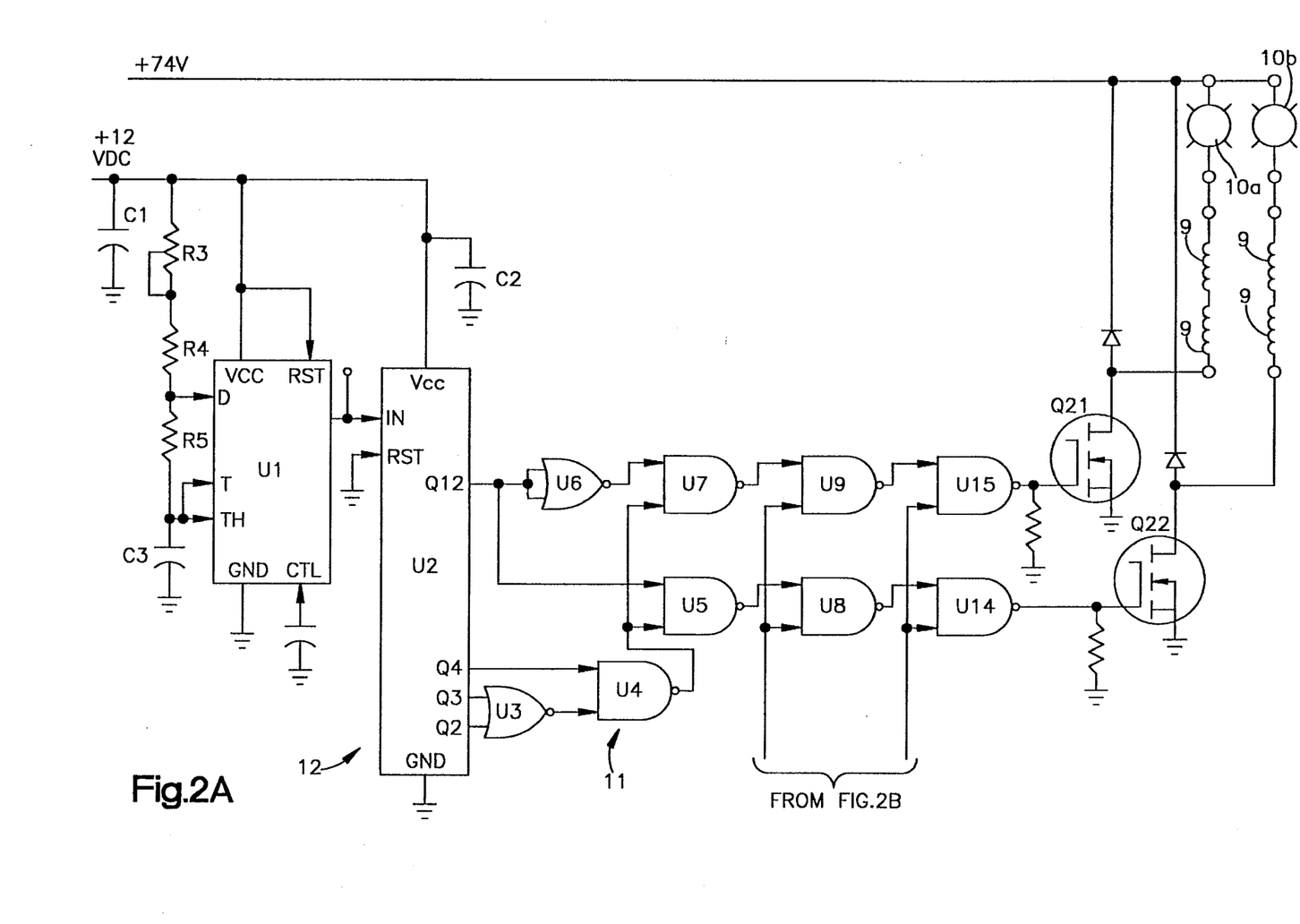
FIGS. 2A and 2B show a flashing circuit according to one embodiment of the invention.

Referring to FIG. 2A, electrical elements, such as a pair of the lights 10a and 10b, are connected across a first voltage source. As shown, the voltage is a 74 volt DC source, which is commonly available on railroad locomotives. Inductors 9 can be provided to limit inrush current through the lights. Voltage across each of the lights 10 is controlled by a corresponding switch, such as transistors Q21 and Q22. The transistors Q21 and Q22 have their sources and drains connected in series between the lights 10 and a ground to permit a current to flow through each of the lights 10 when its corresponding transistor is in a conducting state.

Illumination of the lights 10a and 10b is controlled by providing a signal at the gate of each transistor Q21 and Q22. Each light 10 is energized when the signal is "ON", placing the corresponding transistor Q21 or Q22 in a conducting state. The light 10 is not energized when the signal is "OFF", placing the transistor Q21 or Q22 in a non-conducting state.

The gating signal for the transistors Q21 and Q22 is provided by a pulsing circuit 12. The pulsing circuit 12 includes a means to generate clock pulses, such as a 555 timer U1. A second voltage source, such as 12 volts DC, is used to supply electronic components, such as the timer U1. Filter capacitors C1 and C2 can be connected between the 12 volt source and ground.

A potentiometer R3, resistors R4 and R5, and a capacitor C3 are connected in series between the 12 volts and ground. A tap between the resistors R4 and R5 is input to the discharge D input of the timer U1 to control the frequency of the timer output. A tap between the resistor R5 and the capacitor C3 is input to the trigger T and threshold TH inputs of the timer U1 to continuously trigger the timer. The frequency of the clock pulses from the timer U1 is adjusted with the potentiometer R3. In the embodiment shown, a nominal output frequency of 4096 Hz is used. To achieve a 4096 Hz output with a 12 volt supply, the potentiometer R3 should be approximately 10 KΩ maximum resistance, the resistor R4 should be about 5.62 KΩ, the resistor R5 should be about 13 μKΩ, and the capacitor C4 should be about 0.01 μF.

The clock pulses are input to a counter U2 to provide outputs having several different frequencies. For example, an eight- or twelve-stage counter can be used, each stage having an output at twice the frequency of the next stage.

The timer U1 and twelve-stage counter U2 are preferred for the embodiment shown, however, any means for generating a plurality of pulses at different frequencies can be used and is considered to be within the scope of the invention.

The outputs of the counter U2 are combined with a logic circuit 11 to achieve a desired frequency and duty cycle to generate a flashing sequence. In the embodiment shown in FIG. 2A, the logic circuit 11 produces a series of pulses at 256 Hz having a duty cycle of ⅛. The lights 10 are alternately flashed every half-second When one light 10a or 10b is "ON," the other light is "OFF." When a light 10 is "ON," it is fully energized When a light 10 is "OFF," it is pulsed at 256 Hz and a ⅛ duty cycle, that is, the light is repeatedly energized for 1/2048 second and de-energized for 7/2048 second.

To achieve this flashing sequence, second and third stage outputs Q2 and Q3 of the counter U2, at 1024 Hz and 512 Hz, respectively, are input to a NOR gate U3. A fourth stage output Q4 of the counter U2 is combined with the output of the NOR gate U3 in a NAND gate U4 to provide the 256 Hz, ⅛ duty cycle pulsing signal. The entire pulsing circuit 12 could comprise any means for generating a series of pulses having a duty cycle and a frequency which would maintain a light at a sufficiently dimmed level of illumination so as to be imperceptible relative to a fully illuminated light.

A twelfth stage output Q12 of the counter U2, at 1 Hz, is combined with the pulsing signal in a NAND gate U5 to provide the flashing sequence to the light 10b by controlling the gating of the transistor Q22. The inverse of the twelfth stage output Q12, inverted by a NOR gate U6, is combined with the pulsing signal from the NAND gate U4 in a NAND gate U7 to provide the flashing sequence to the light 10a by controlling the gating of the transistor Q21.

Figure 2B:
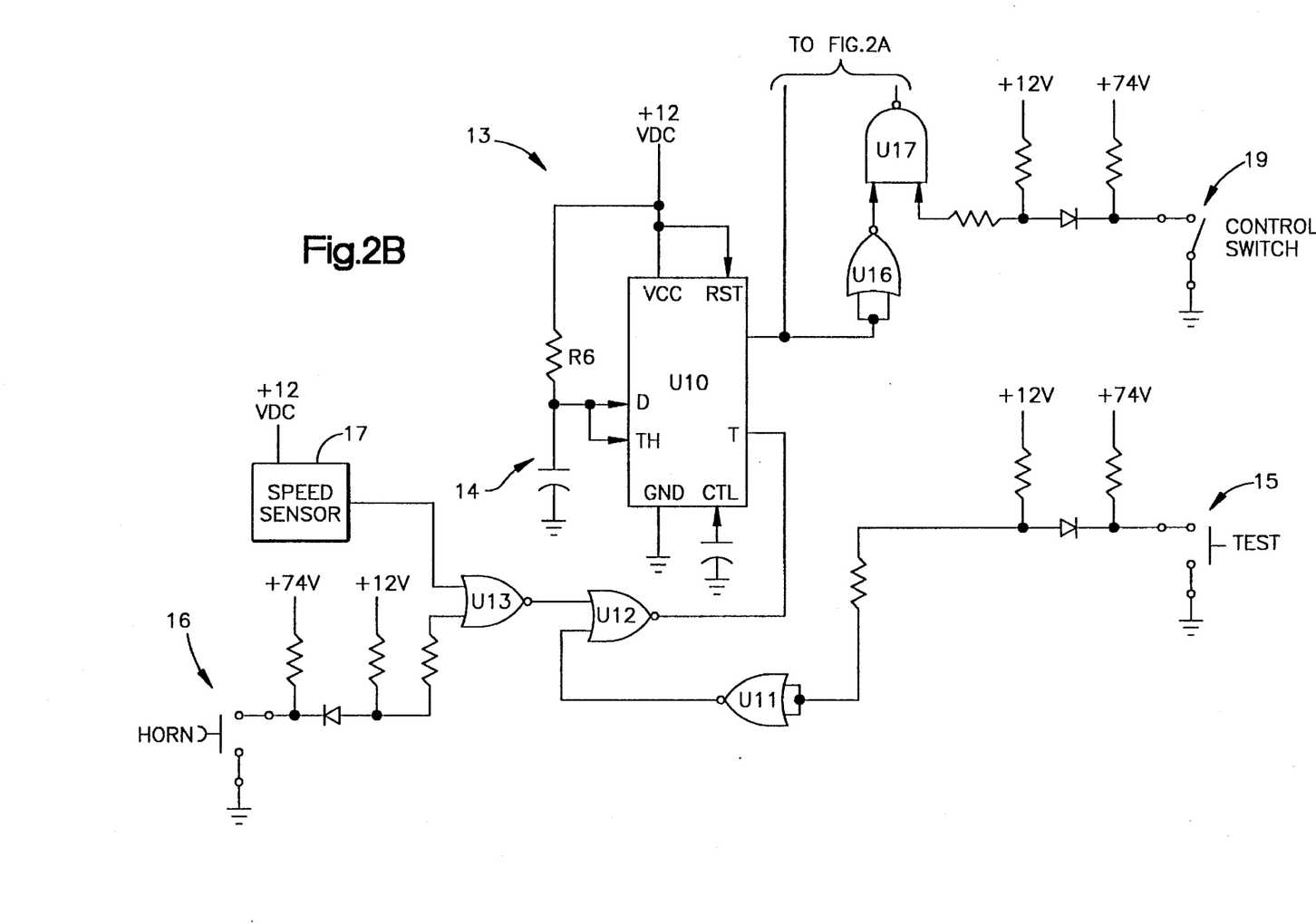

An enabling circuit 13, shown in FIG. 2B, is provided to control activation of the flashing sequence. The enabling circuit enables the flashing sequence to control the transistors Q21 and Q22 to flash the lights 10. As shown in FIG. 2A, outputs of the enabling circuit 13 and outputs of the NAND gates U5 and U7 are input to respective enabling NAND gates U8 and U9.

Referring to FIG. 2B, the enabling circuit 13 includes a timing circuit 14 which uses a timer U10, such as a 555 timer. A resistor R6 is connected between 12 volts and discharge D and threshold TH inputs of the timer U10 to control the frequency of the timer output. For vehicle applications, such as ditch lights for the railroad locomotive, the timer output should be in an "ON" condition for several seconds or even minutes, thus the value of the resistor R6 should be relatively high, on the order of 1.5 MΩ. The output of the timer U10 is the enabling circuit output which is input to the NAND gates U8 and U9.

The timer U10 can be triggered upon the occurrence of a specified condition by a condition responsive means. Several examples are shown which would be preferred for the locomotive ditch light flashing system.

One condition responsive trigger means shown is a test switch 15. The test switch 15 is connected to the trigger input T of the timer U10 through two NOR gates U11 and U12. When the test switch is closed, the timer U10 trigger T is grounded, thereby placing the timer output in an "ON" condition for a time dependent on the value of the resistor R6 When the timer output is "ON "one of the inputs to each of the enabling NAND gates U8 and U9 is "ON." Thus, the circuit 11 is enabled to control the lights 10 with the flashing sequence from the outputs of the NAND gates U5 and U7.

A horn switch 16 (FIG. 2B), closed when a horn on the locomotive is sounded, can be used to enable the flashing sequence in a similar manner to the test switch 15. The horn switch 16 is connected to the timer U10 trigger input T through the NOR gate U12 and a NOR gate U13 to ground the trigger input when the switch 16 is closed.

In place of the switch 16, a pressure-responsive switch may be located in the air line for the horn. The pressure-responsive switch would close whenever the horn is actuated and air pressure is supplied to the horn.

A speed sensor switch 17 can be connected to the timer U10 trigger input T through the NOR gates U12 and U13. The speed sensor 17 can be connected to a frequency-to-voltage converter which grounds the trigger input T when the speed of the locomotive falls within a selected range. For example, a locomotive in a switching yard may have its ditch lights disabled when the horn sounds and it is traveling very slowly. Thus, its speed sensor switch 17 would allow the horn switch 16 to trigger the timer U10 only when it senses that the speed of the locomotive is above a certain minimum level.

Instead of sensing locomotive speed, a throttle switch 18 can be connected in a similar manner to the speed sensor 17 to enable the flashing sequence when the throttle is adjusted or is set within a selected range of locations.

Other condition responsive devices can be similarly connected to trigger the timer U10. Alternatively, a condition responsive device can be connected to directly enable the flashing sequence without a timer. This would be desirable when direct control is preferred rather than timed enabling of the flashing sequence. For example, when a throttle switch 18 is used, the locomotive may drift after the throttle is disengaged. Thus, a timer is preferred to maintain the flashing of the lights for a specified time after the throttle is disengaged. On the other hand, when a speed sensor 17 is used, the speed sensor would continue to enable the flashing sequence during the drifting of the locomotive. Thus, a timer might not be desired.

In some cases it may be desirable to fully illuminate the lights 10 without flashing. A control switch circuit 19 (FIG. 2B) is provided for this purpose. The control switch 19 is connected to control the transistors Q21 and Q22 through control circuit NAND gates U14 and U15, in FIG. 2A. The control circuit NAND gates U14 and U15 also have inputs from outputs of the enabling NAND gates U8 and U9, respectively. The output of the enabling timer U10, inverted by a NOR gate U16, and the control switch circuit 19 are input to an override NAND gate U17 connected to the control circuit NAND gates U14 and U15.

The control switch 19 is normally closed to ground the input to the override NAND gate U17. This maintains one input to the control circuit NAND gates U14 and U15 in an "ON" state. Thus, the lights 10 are controlled by the other inputs to the NAND gates U14 and 15. When the control switch 19 is open and the timer output is in an "OFF" state, both inputs to the override NAND gate U17 are "ON" and the outputs of control circuit NAND gates U14 and U15 are "ON," thereby fully illuminating the lights 10 so long as the control switch 19 is open and the timer U10 output is "OFF." When the timer U10 output is "ON," one input to the override NAND gate U17 is "OFF," and the output of the NAND gate U17 is "ON" so that the lights 10 are controlled by the outputs of the enabling NAND gates U8 and U9. Thus, when the timer U10 output is "ON," the control circuit is overridden and the position of the control switch 19 is irrelevant. When the timer U10 output is "OFF," the control switch 19 fully illuminates the lights or completely extinguishes the lights.

Figure 3:
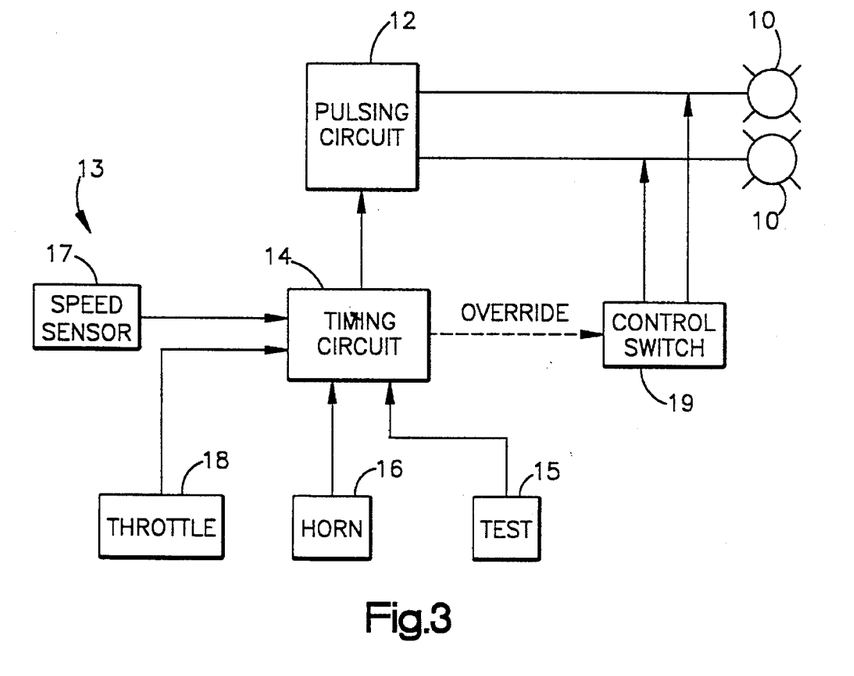
FIG. 3 shows a block diagram of the flashing circuit.

In operation, referring to FIG. 3, the control switch 19 is normally deactivated so that the lights 10 are normally deenergized. At some point, one of the conditions for activating the flashing sequence, for example, sounding the horn, is satisfied. The horn switch 16 then triggers the timing circuit 14 which activates the pulsing circuit 12. The pulsing circuit 12 flashes the lights 10 by alternately energizing each and then pulsing each. The lights 10 continue flashing until the timing circuit 14 times out, for example, after 30 seconds, which deactivates the pulsing circuit 12 to de-energize the lights 10.

An alternative sequence might involve the control switch 19 being activated to fully energize the lights 10. An operator would then move the throttle to place the locomotive in motion and activate the throttle switch 18. The throttle switch 18 triggers the timing circuit 14 to activate the pulsing circuit 12. The timing circuit 14 overrides the control switch 19, and the lights 10 are flashed until the throttle switch 18 is deactivated and the timing circuit 14 times out, at which point the lights 10 are again fully energized under the control of the control switch 19.

Figure 4:
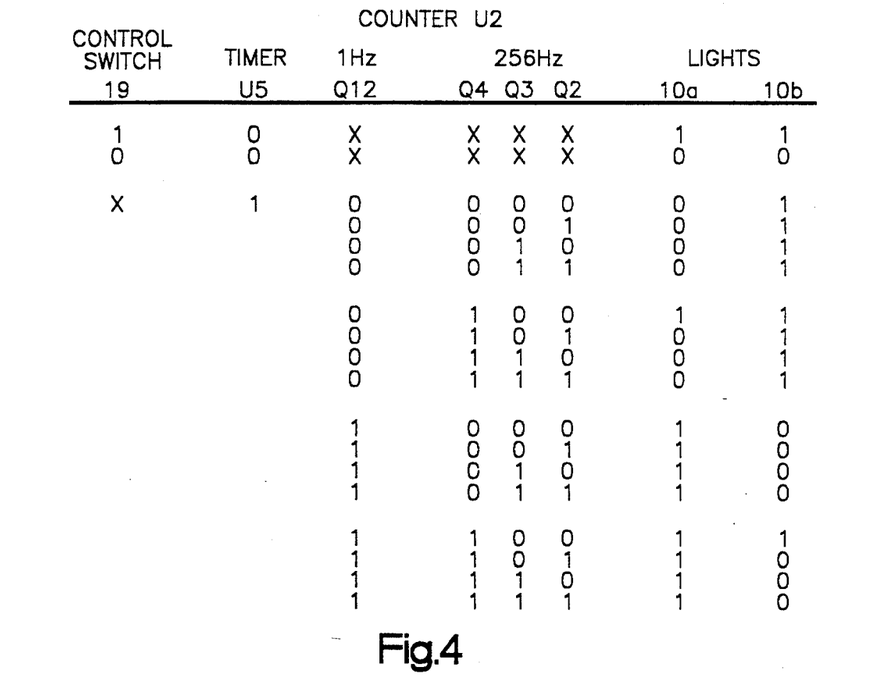
FIG. 4 shows a truth table for the flashing circuit.

FIG. 4 is a truth table showing the status of the lights 10 during different parts of the flashing sequence according to the preferred embodiment shown. It is given that the timer U1 is generating a 4096 Hz clock pulse, and the control switch 19 is in an "ON" state when it is open. A "1" condition represents "ON," and a "0" condition represents "OFF."

As seen in the FIG. 4, when the output of the enabling timer U5 is "OFF," the state of the counter U2 is irrelevant and the lights are controlled by the control switch 19. When the timer U5 is "OFF" and the control switch 19 is "ON" the lights 10 are "ON". When the timer U5 is "OFF" and the control switch 19 is "OFF" the lights 10 are "OFF".

On the other hand, the condition of the control switch 19 is irrelevant when the output of the enabling timer U5 is "ON". When the output of the enabling timer U5 is "ON," the lights 10 are controlled by the outputs of the counter U2 as combined by the logic circuit 11. As shown, the output Q12 is "OFF" for ½ second and "ON" for ½ second. During each 1 second cycle of the output Q12, the outputs Q4, Q3, and Q2 count from 0 0 0 to 1 1 1 at a rate of 256 Hz. Thus, during the ½ second that Q12 is "OFF," the outputs Q4, Q3, and Q2 cycle 128 times.

When the output Q4 is "ON" and the outputs Q3 and Q2 are "OFF," that is, 1 0 0, the light 10a is "ON." During the other seven possible states of the outputs Q4, Q3, and Q2, the light 10a is "OFF." Thus, the light 10a is "ON" during one of eight possible states, that is, ⅛ of the time. The 1 0 0 state occurs 128 times during the ½ second that the output Q12 is "OFF," thus the light 10a is pulsed 128 times, for ½048 second each time. In other words, the light 10a is pulsed at 256 Hz at a ⅛ duty cycle. When the output Q12 is "OFF," the light 10b is energized continuously.

After ½ second, the state of the output Q12 changes to "ON," and the light 10a is energized continuously. During the ½ second when the output Q12 is "ON," the light 10b is energized each time the outputs Q4, Q3, and Q2 are in a 1 0 0 state, respectively. Thus, the light 10b pulses 128 times for ½048 second each time similarly to the pulsing of the light 10a, described above.

Thus, it can be seen that the circuit shown in FIG. 2A alternately energizes and pulses each light in a flashing sequence.

Figure 5:
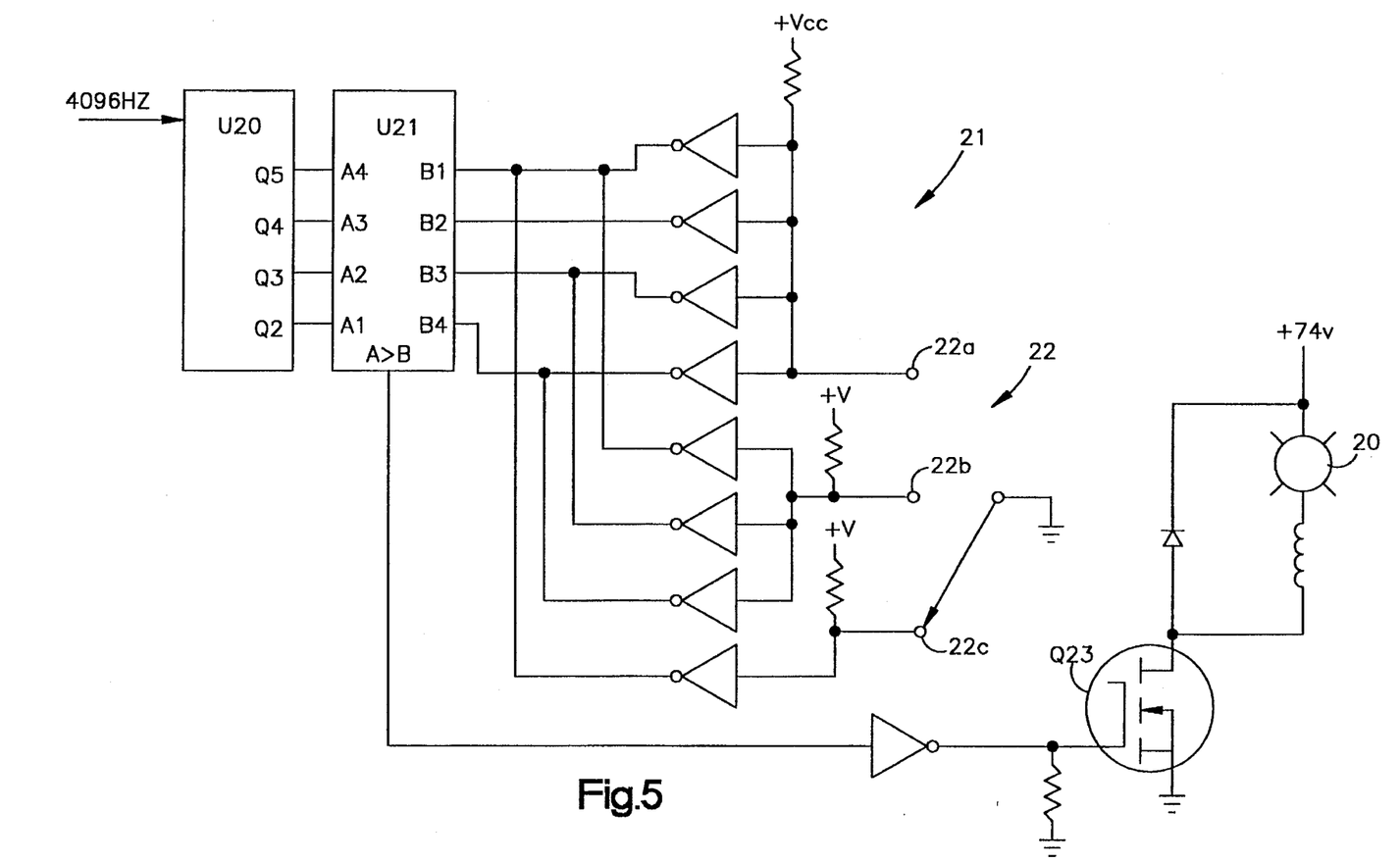
FIG. 5 shows a dimming circuit according to another embodiment of the invention.

Referring to FIG. 5, the present invention also comprehends a pulsing circuit which is used to dim a light, such as the headlight 20, without flashing. In the preferred embodiment shown, the light 20 is connected across a voltage, for example, 74 volts DC. A switch, such as a transistor Q23, is used to control the voltage to the light 20.

A pulsing circuit 21 is used to generate pulses at different duty cycles. As shown, a twelve-stage counter U20 is provided with a clock input which can be generated similarly to the input to the counter U2 in FIG. 2A. The clock input has a substantially constant frequency, for example, 4096 Hz. The counter U20 generates a series of digital values. Outputs Q2, Q3, Q4, and Q5 of the counter U20, at 1024 Hz, 512 Hz, 256 Hz, and 128 Hz, respectively, are connected to A inputs of a digital comparator U21, such as a 74C85 four-bit magnitude comparator. The lowest frequency output Q5 is preferably connected to the least significant bit (LSB) A input of the comparator U21. The comparator U21 compares the magnitude (digital value) of the A inputs with the magnitude of B inputs to the comparator U21. The comparator U21 has three outputs, A>B, A=B, and A<B, one of which is "ON" depending on the relative magnitudes of the A and B inputs. In the present example, the A>B output is used.

A rotary selector switch 22, such as a single pole, multiple throw switch has its pole connected to ground. A bright position 22a of the switch is connected to four inverters and each of the inverter outputs is connected to a B input of the comparator U21. A medium position 22b of the selector switch is connected through inverters to comparator inputs B1, B3, and B4, input B1 corresponding to the least significant bit. A dim position 22c of the switch 22 is connected through an inverter to comparator U20 input B1. Each switch position 22a, 22b, and 22c is also connected to a control voltage Vcc through a resistor. The A>B output of the comparator U21 is connected through an inverter to the gate of the transistor Q23.

When the magnitude of the A inputs is greater than the magnitude of the B inputs, the A>B output of the comparator is "ON." In that condition, the transistor Q23 is nonconducting and the light 20 is not illuminated. When the magnitude of the A inputs is not greater than the magnitude of the B inputs to the comparator U21, the output of the comparator is "OFF," thus the transistor Q23 is conducting and the light 20 is illuminated.

In the configuration shown in FIG. 5, the switch 22 is used to select a four bit digital value to be input to the B inputs of the comparator U21. The bright position 22a inputs a digital value of 1 1 1 1, that is, 15 in decimal. The medium position 22b inputs a value of 1 0 1 1 (11 decimal), and the dim position 22c inputs a value of 1 0 0 0 (8 decimal).

Figure 6:
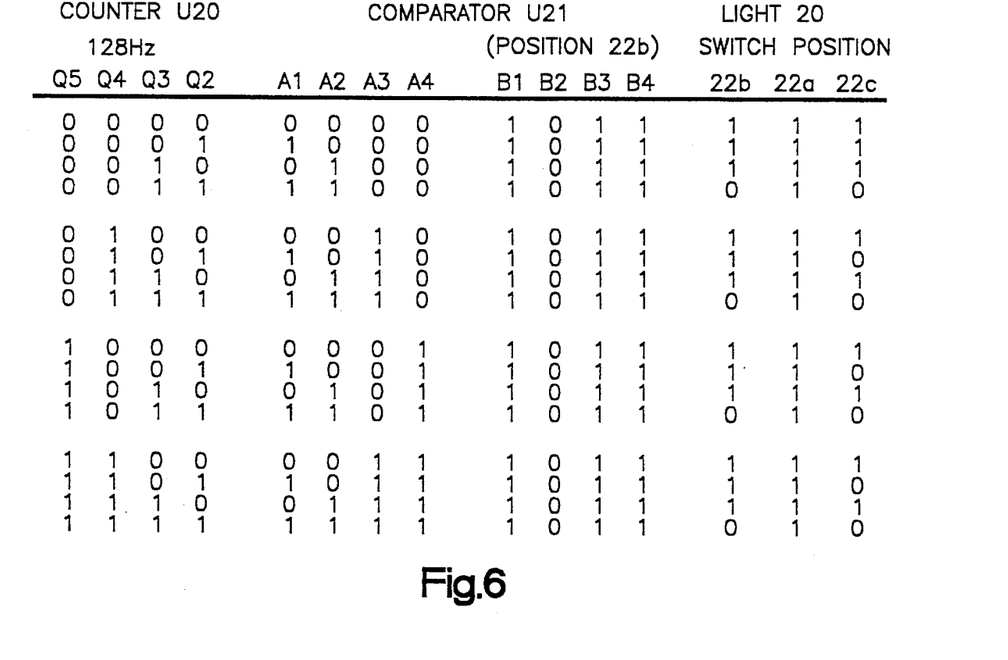
FIG. 6 shows a truth table for the dimming circuit.

Referring to FIG. 6, the outputs Q2, Q3, Q4, and Q5 from the counter U20 are shown in the first column. These correspond to the inputs A1, A2, A3, and A4 to the comparator U21 shown in the second column. Note, however, that the least significant bit output Q2 from the counter is the most significant bit (MSB) input A1 to the comparator. The reason for this is discussed below. As an example, it is assumed that the selector switch 22 is at the medium position 22b to provide the B inputs with the value 1 0 1 1, as shown in the third column. When the value of the A inputs is greater than 1 0 1 1, the light 20 is not illuminated. This occurs only when A1 and A2 are both "ON." When the value of the A inputs is not greater than 1011, the light 20 is illuminated. As shown in the fourth column of FIG. 6, for switch position 22b, the light 20 is "ON" for three of every four counts of the counter U20. Thus, it is illuminated at 512 Hz and a ¾ duty cycle.

If the significance of the output bits from U20 were not reversed, that is, if MSB Q5 input were used as MSB A1, the light 20 would still be illuminated at a ¾ duty cycle. However, the light would be illuminated for four consecutive counts of the counter U20 and extinguished for twelve subsequent counts. Thus, the frequency would be 128 Hz. Accordingly, by reversing the significance of the bits, smoother pulsing can be achieved without additional complexity.

Referring to the last two sub columns of the fourth column of FIG. 6, the illumination of the light 20 is shown when different switch 22 positions are selected. When the bright position 22a is selected, the B inputs to the comparator are 1 1 1 1. Thus, A can never be greater than B with a four bit input and the light 20 is always "ON." When the dim position 22c is selected, the B inputs to the comparator are 1 0 0 0. The light is illuminated when A is not greater than 1 0 0 0 (8 in decimal). Thus, the light is illuminated 9 of every 16 counts of the counter U20 for a 128 Hz, 9/16 duty cycle pulse signal. Note that the pulses are evenly distributed with one additional pulse at counter output 0 0 0 1.

The frequency of the pulses can be adjusted by changing the frequency of the input to the counter U20 or by using different outputs from the counter U20. The duty cycles can be modified by inputting different values to the B inputs of the comparator U21. More flexibility can be provided by using more outputs from the counter U20 and a higher capacity comparator. An alternative configuration would use different combinations of logic gates similar to the flashing circuit of FIG. 2 to permit selection of a desired frequency or duty cycle with a selector switch. The desired frequency and duty cycles depend on the characteristics and application of the light 20.

Where the voltage supplied to the light 20 exceeds the rated voltage of the light, the full illumination provided by the bright position 22a of the switch 22 may be eliminated to prevent an excessive voltage across the light. In this way, the pulsing circuit 21 can be used to effectively drop the voltage without voltage dropping resistors. Further, the pulsing circuit 21 is not limited to dimming a light. The circuit could be used to dim, that is, reduce the effective voltage across, any electrical element or component.

The present disclosure describes several embodiments of the invention, however, the invention is not limited to these embodiments. Other variations are contemplated to be within the spirit and scope of the invention and appended claims.

What is claimed is:

1. A control circuit for an element connectable across a voltage, comprising:

a switching circuit connected to control the voltage across the element; and a dimming and flashing circuit connected to control the switching circuit for fully energizing the element to place the element continuously in a fully energized state, for energizing the element with a series of voltage pulses at a specific duty cycle to place the element in a dimmed state, and for alternately rapidly changing the states of the element between the fully energized state and the dimmed state to place the element in a flashing state, the dimming and flashing circuit including a control switch connected to operate the dimming and flashing circuit to continuously place the element in the fully energized state.

2. A control circuit according to claim 1, wherein the element is a light.

3. A control circuit according to claim 1, wherein the dimming and flashing circuit comprises a circuit for generating sequential pulse signals of different frequencies and a logic circuit for combining the pulse signals to an output which controls the switching circuit.

4. A control circuit according to claim 3, wherein the circuit for generating sequential pulse signals of different frequencies comprises a clock signal generator having its output connected to a counter input.

5. A control circuit according to claim 2, wherein the light is pulsed at a frequency of at least 128 Hz.

6. A control circuit according to claim 1, further comprising means for selecting different pulse rates.

7. A control circuit according to claim 1, further comprising means for selecting different duty cycles.

8. A control circuit for an element connectable across a voltage, comprising:

a switching circuit connected to control the voltage across the element; and a dimming and flashing circuit connected to control the switching circuit for fully energizing the element to place the element in a fully energized state, for energizing the element with a series of voltage pulses at a specific duty cycle to place the element in a dimmed state, and for alternately rapidly changing the states of the element between the fully energized state and the dimmed state to place the element in a flashing state, the dimming and flashing circuit comprising a circuit for generating a series of digital counter values, a circuit for selecting a digital input value, and a circuit for comparing the counter values with the input value connected to operate the switching circuit responsive to the relative magnitudes of the counter values and input value.

9. A light dimming circuit, comprising:

a switching circuit connected to control the voltage across the light;

a dimming circuit connected to control the switching circuit for selectively energizing the light continuously or energizing the light with a series of voltage pulses at a specific duty cycle; and an energization circuit for enabling the selective energization of the light, the energization circuit comprising an activator having an output, and an activator NAND gate combining the output of the dimming circuit with the activator output and connected to control the switching circuit.

10. A light dimming circuit according to claim 9, further comprising means for alternately selecting continuous energization and flashing of the light.

11. A light dimming circuit according to claim 9, further comprising two lights adapted to be alternately energized and pulsed by the switching circuit so that one light is pulsed while the other light is energized continuously.

12. A light dimming circuit according to claim 9, wherein the activator comprises a timer.

13. A light dimming circuit according to claim 9, further comprising a control switch circuit connected to energize the light.

14. A light dimming circuit according to claim 9, further comprising a control switch circuit connected to energize the light, the energization circuit being connected to disable the control switch circuit.

15. A light flashing circuit for a vehicle, comprising:

a pulsing circuit adapted to flash the light by alternately dimming the light by pulsing the light at a fractional duty cycle using a timer and energizing the light fully;

a timing circuit separate from the timer and connected to continue activation of the pulsing circuit for a specified duration after initiation; and a condition responsive trigger connected to initiate the timing circuit.

16. A light flashing circuit according to claim 15, wherein the condition responsive trigger is a vehicle speed sensor switch.

17. A light flashing circuit according to claim 15, wherein the flashing circuit is adapted to flash two lights in an alternating sequence.

18. A locomotive light warning system, comprising:

a locomotive;

a light mounted on the locomotive adapted to provide a visual warning near the locomotive;

a horn located on the locomotive adapted to provide an audible warning system;

a pulsing circuit adapted to alternately dim the light by pulsing the light at a fractional duty cycle and fully energize the light; and a condition responsive trigger responsive to the horn connected to activate the pulsing circuit.

19. A locomotive light warning system, comprising:

a locomotive;

a light mounted on the locomotive adapted to provide a visual warning near the locomotive;

a horn located on the locomotive adapted to provide an audible warning system;

a pulsing circuit adapted to alternately dim the light by pulsing the light at a fractional duty cycle using a timer and fully energize the light;

a condition responsive trigger responsive to the horn connected to activate the pulsing circuit; and a timing circuit separate from the timer and connected to be initiated by the condition responsive trigger to continue activation of the pulsing circuit for a specified duration after initiation.

20. A locomotive light warning system, comprising:

a locomotive;

a first light mounted on the locomotive adapted to provide a visual warning near the locomotive;

a horn located on the locomotive adapted to provide an audible warning system;

a pulsing circuit adapted to alternately dim the light by pulsing the light at a fractional duty cycle and fully energize the light;

a condition responsive trigger responsive to the horn connected to activate the pulsing circuit; and a second light on the locomotive, wherein the warning system is adapted to flash the two lights in an alternating sequence.

* * * * *

UNITED STATES PATENT AND TRADEMARK OFFICE
CERTIFICATE OF CORRECTION

PATENT NO. : 5,534,733
DATED : July 6, 1996
INVENTOR(S) : Wetzel et al.

It is certified that error appears in the above-indentified patent and that said Letters Patent is hereby corrected as shown below:

Column 3, line 35, "13μKΩ" should be —13 KΩ—
Column 3, line 52, a period — . — should appear after "half-second".
Column 3, line 54, a period — . — should appear after "energized".
Column 4, line 36, a period — . — should appear after "R6".
Column 4, line 36, " "ON "one " should be — "ON," one —.
Column 7, line 8, "Vcc" should be —$V_{cc}$—.
Column 7, line 37, "1011" should be — 1 0 1 1 —.

Signed and Sealed this

Twenty-fourth Day of December, 1996

Attest:

BRUCE LEHMAN

*Attesting Officer*  *Commissioner of Patents and Trademarks*